(12) United States Patent
Wells

(10) Patent No.: US 10,200,434 B1
(45) Date of Patent: Feb. 5, 2019

(54) ENCODING MARKERS IN TRANSPORT STREAMS

(71) Applicant: Amazon Technologies, Inc., Reno, NV (US)

(72) Inventor: Trevor Wells, Washougal, WA (US)

(73) Assignee: Amazon Technologies, Inc., Reno, NV (US)

( * ) Notice: Subject to any disclaimer, the term of this patent is extended or adjusted under 35 U.S.C. 154(b) by 165 days.

(21) Appl. No.: 15/263,102

(22) Filed: Sep. 12, 2016

(51) Int. Cl.
| | |
|---|---|
| H04L 29/06 | (2006.01) |
| H04N 21/4385 | (2011.01) |
| H04N 21/44 | (2011.01) |
| H04N 21/4363 | (2011.01) |

(52) U.S. Cl.
CPC ......... *H04L 65/607* (2013.01); *H04L 65/601* (2013.01); *H04N 21/4385* (2013.01); *H04N 21/44004* (2013.01); *H04N 21/43635* (2013.01)

(58) Field of Classification Search
CPC . H04L 65/607; H04L 65/601; H04N 21/4385; H04N 21/44004; H04N 21/43635
See application file for complete search history.

(56) References Cited

U.S. PATENT DOCUMENTS

| | | | | |
|---|---|---|---|---|
| 2009/0070799 A1* | 3/2009 | Jacobs | ............... | H04N 7/17318 725/20 |
| 2013/0198013 A1* | 8/2013 | Shehan | .................. | G06Q 30/02 705/14.73 |
| 2014/0282697 A1* | 9/2014 | Sinha | ..................... | H04H 60/40 725/32 |
| 2018/0124147 A1* | 5/2018 | Ramamurthy | .......... | H04L 67/02 |

OTHER PUBLICATIONS

SCTE, "SCTE 67 2014, Recommended Practice for SCTE 35 Digital Program Insertion Cueing Message for Cable", Society of Cable Telecommunications Engineers, Engineering Committee, Digital Video Subcommittee, 2014, 76 pages.*

* cited by examiner

Primary Examiner — Brian J. Gillis
Assistant Examiner — Chhian (Amy) Ling
(74) Attorney, Agent, or Firm — Hogan Lovells US LLP

(57) ABSTRACT

Pre-roll markers are encoded into media content at determined locations to provide a specified amount of pre-roll time before supplemental content is to be provided in place of the primary content of the media file. The supplemental content can be any appropriate content, as may relate to promotional or information content relevant in some way to the primary content or a viewer of the primary content. A marker such as a SCTE-104 message can be received with the media input and translated to a SCTE-35 message during the encoding process. The video stream can be buffered by an amount corresponding to a determined pull-up time such that the SCTE-35 marker, when received to the multiplexer, can be placed into the transport stream at the appropriate location. When received, the marker can provide sufficient notice to prepare the supplemental content to be displayed at the injection point.

20 Claims, 6 Drawing Sheets

ENCODING MARKERS IN TRANSPORT STREAMS

BACKGROUND

Users are increasingly obtaining content in digital format, often downloading or streaming that content from a remote service. Because different users or client devices require the content to be in specific formats, for example, the remote service will often perform tasks such as video encoding. For streaming video, a provider will often want to designate places where advertising or other supplemental content should be placed relative to the playback of the video content, such as between scenes or at the beginning of a particular segment. In conventional approaches an upstream generator will place a marker in the stream with a time stamp corresponding to the video frame before which the supplemental content should be displayed. Systems can detect this marker and provide notification at a determined amount of time before that frame is rendered for playback, in order to provide sufficient time to determine and/or render the supplemental content for display. In some situations, however, the markers are placed at, or very close to, the video frame in the playback such that there is insufficient time to ready the supplemental content for display.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the encoding of media files and streams. In particular, various embodiments provide for the encoding of markers, such as SCTE-35 markers, into the media content at locations sufficient to provide a determined amount of pre-roll time before supplemental content is to be provided in place of the primary content of the media file. The supplemental content can be any appropriate content, as may relate to promotional or information content relevant in some way to the primary content or a viewer of the primary content. A marker inserted as according to a communication standard, such as a SCTE-104 message, can be received with the media input to be encoded, and can be translated to a SCTE-35 message during the encoding process. The video stream can be buffered by an amount corresponding to a determined pull-up time such that the SCTE-35 marker, when received to the multiplexer, can be multiplexed into the output media stream at the appropriate location. When received by the device presenting the media stream, the SCTE-35 marker can be detected with sufficient time to prepare the supplemental content to be displayed at the corresponding injection point.

Various other such functions can be used as well within the scope of the various embodiments as would be apparent to one of ordinary skill in the art in light of the teachings and suggestions contained herein.

Figure 1:
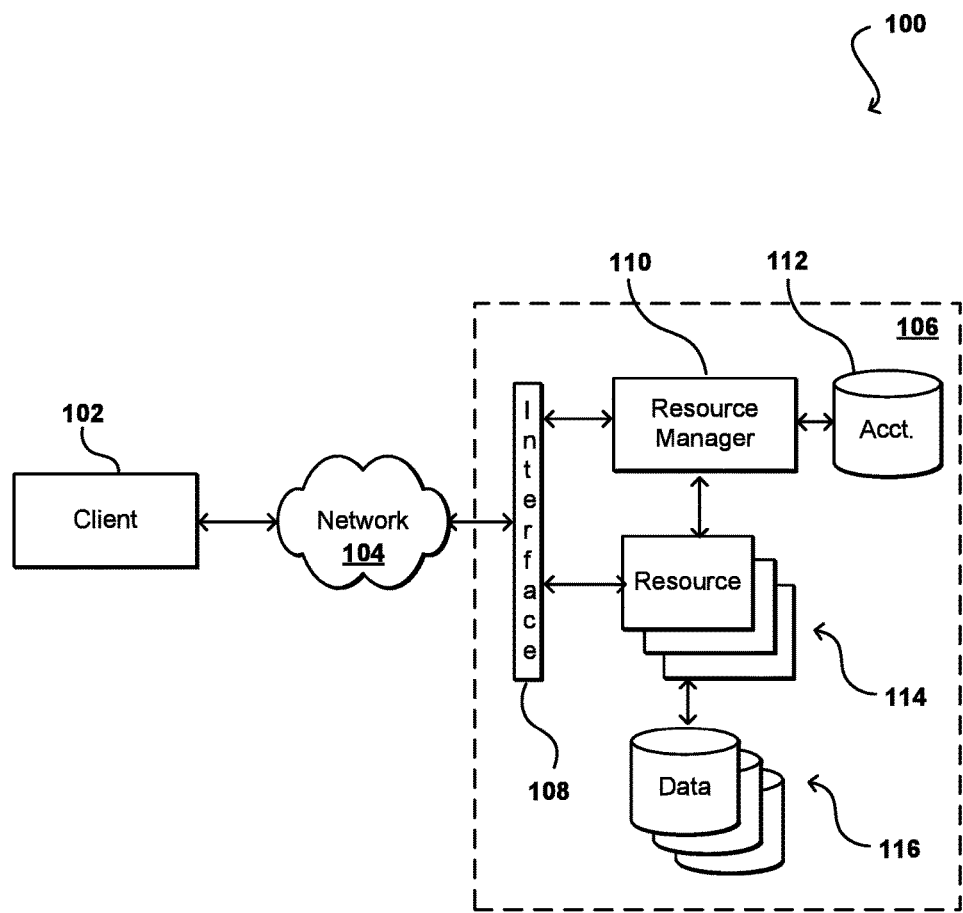
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
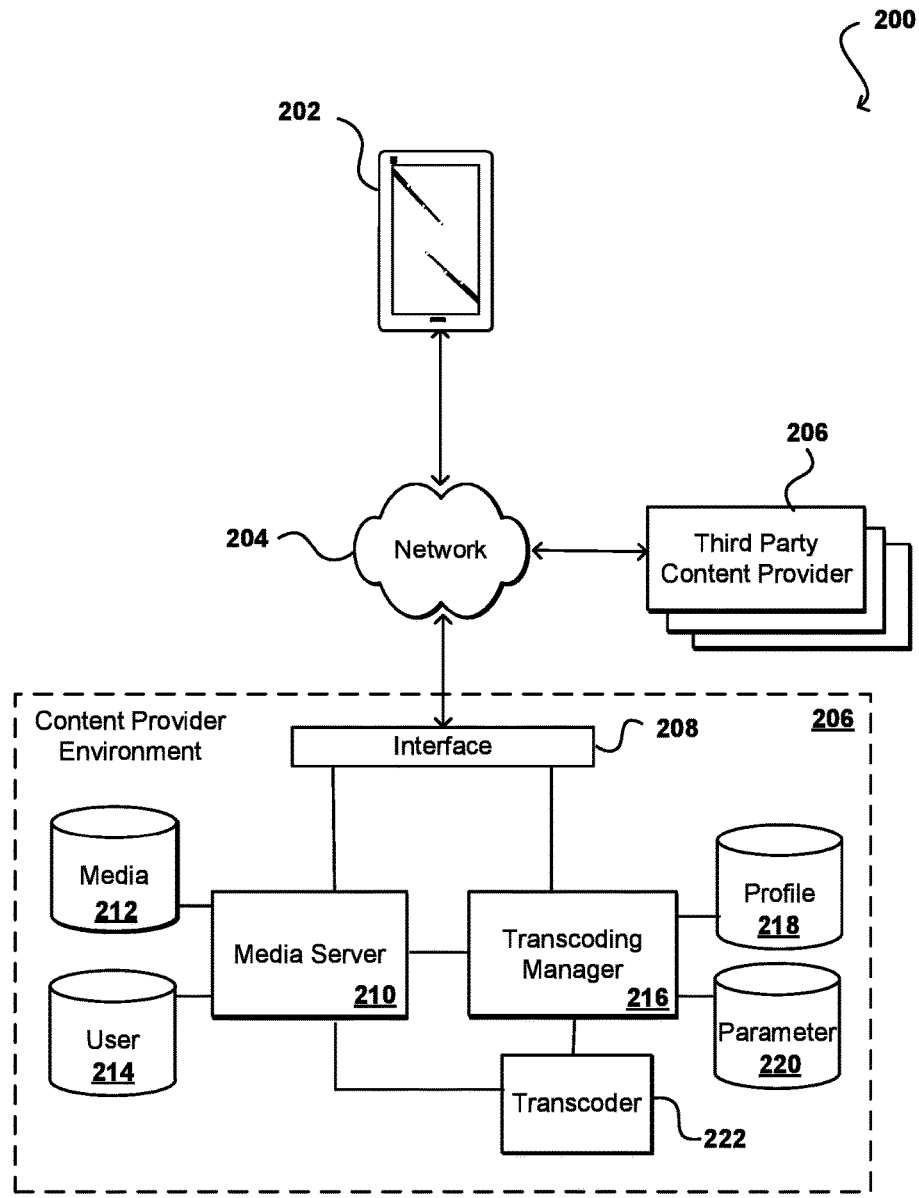
FIG. 2 illustrates an example subsystem for managing media file encoding that can be utilized in accordance with various embodiments.

FIG. 2 illustrates an example system 200 that can be used to implement aspects of the various embodiments, in an electronic environment such as that discussed with respect to FIG. 1. In the system of FIG. 2, a client computing device 202 can submit a request for content across at least one network 204 to be received by a content provider environment 208. As mentioned, in at least some embodiments the request can include a request for content to be displayed on the computing device 202, and in many cases will include video or other media content that is encoded for presentation on the client device 202. The network(s) can include any appropriate network, such as the Internet, a local area network (LAN), a cellular network, an Ethernet, or other such wired and/or wireless network. The content provider environment 208 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 212 while a request to specify encoding parameters might be forwarded to a encoding manager 216, among other such options. These calls or requests can also come from third parties, although third party providers 206 can also provide at least some of the media content to be stored to a media repository 212 and encoded for display on the client device 202 as discussed herein.

In this example, a call received to the content provider environment 208 can be received by an interface layer 210 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 212 or other such repository to be sent back across the network(s) to the computing device. In some embodiments, information for the request might also be compared against user data in a user data store 214 or other such location to determine, for example, whether the user has access rights to that content, and potentially the formats or versions to which the user has access rights.

In at least some embodiments a request from an operator, an administrator, a client device 202, a third party provider 224, or another such source might include a request to specify one or more sets of encoding parameters to be used with a media file. Accordingly, information regarding the encoding parameters can be provided to a encoding manager 216, or other such component or service, that is able to receive the information through an appropriate interface (i.e., an API or console) and cause the profile and parameter data to be stored to appropriate repositories 218, 220 as discussed elsewhere herein. When a request for a video file is received, the encoding manager 216 can use the profile and parameter data to determine the appropriate encoding information, and can pass that to one or more encoders 222, which can obtain the media file and encode the media file per the encoding information, which can then be provided to the client device by a media server 210 or other such component.

In some embodiments the encoding subsystem includes one or more encoders, a set of bitstreams (or video signals), and a content delivery network. The one or more encoders can include both encoders and packagers, which can be implemented via an origin server. A packager can receive a signal (e.g., feed), such as a video signal or a live stream. The live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the content delivery network (CDN). The bitstreams can represent various encoded/packaged versions of the signal feed, as may be encoded per the encoding parameters from the encoding manager 216. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

As mentioned, in many situations a content provider will want to inject supplemental content, or take other such actions, at specific locations in the presentation of a video file. This can include, for example, injecting advertising breaks at specific locations in a video feed, such as between segments or at the beginning of a portion of the playback. Content providers in some embodiments can receive content over inputs such as serial digital interface (SDI) inputs, where the content can include messages such as SCTE-104 or SCTE-35 messages that indicate the appropriate locations for these breaks. It should be understood, however, that other types of messages and communication standards can be used as well within the scope of the various embodiments. SDIs are digital media interfaces that can support various video resolutions, frame rates, three-dimensional content, and other types of media. SDIs typically transmit uncompressed, unencrypted digital video signals, and can be used for packetized data. In a cloud-based environment, for example, an encoding system can utilize SMPTE-2022 to send digital video over an IP network using a video format such as SDI. An SDI port in at least some embodiments will only allow for one component or process to read from the port at any given time. Various media encoders or transcoders can monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs), electronic data processing (EDP) interfaces, user datagram protocol (UDP) inputs, or high-definition multimedia inputs (HDMIs), can be monitored using such processes as well.

In various implementations, upstream generators will place the marker for a break, action point, or injection point in the stream at the same time code or location, relative to the video frame, where the break, action point, or injection should occur. The injection can include the addition of alternative content while the remaining media content playback is paused, while an action can include starting another channel or selecting additional content to be presented during playback, among other such options. While many conventional approaches provide for some amount of pre-roll time, or provide the marker at a determined point prior in the stream to where the action or injection should occur, some providers provide little to no pre-roll time such that there can be issues with enabling the supplemental content (e.g., advertising or related content) to be ready to display at the appropriate time during playback.

Accordingly, approaches in accordance with various embodiments can attempt to encode appropriate injection information into the stream itself in order to allow for sufficient time to enable the supplemental content to be determined, prepared, and/or otherwise ready to display at the determined injection point. In some embodiments, a streaming media service can consume the SDI input, or other appropriate media interface input, which can have markers such as SCTE-104 markers (per the standards set forth by the Society of Cable Telecommunications Engineers) that indicate locations for the injection of supplemental content, such as advertising. SCTE-104 messages are often received in input from sources such as regional broadcasting systems and used for the automated insertion of commercials. The service can ensure that an instantaneous decoder refresh (IDR) frame occurs at the point for the injection. An IDR frame is a type of I frame using in MPEG-4 encoding that designates that frames following the IDR frame may not refer back to, or build from, frames occurring in the stream before the IDR frame. In some embodiments, the detection of an IDR frame can also cause the contents of a reference picture buffer to be cleared out. Subsequent frames can then be encoded or decoded without reference to the any frame prior to the IDR frame.

According to the example process, a received SCTE-104 message can be converted or translated to a SCTE-35 message that can be passed with the video content as part of the transport stream. In some processes, SCTE-35 messages might be received with the input content. The SCTE-35 messages received on the transport stream can identify every insert event, action point, or injection point. SCTE messages also can provide for confidentiality and protection against the unauthorized insert of commercials or advertising by third parties intercepting the stream. SCTE-104 messages typically are generated directly before the insertion points. The encoding of a SCTE-35 message in the transport stream, however, enables the message to be placed at an appropriate point in the stream to allow for a sufficient amount of pre-roll time, as may be specified by the user or otherwise determined. When the media data arrives at a transport stream muxer or other such component, approaches in accordance with various embodiments can allow for the application of a pull-up time on the SCTE-35 message relative to the video content. The SCTE-35 message can contain the same data internally, but can be moved up (or to a prior location relative to playback) by a specified amount of pull-up time based at least in part upon the program clock reference (PCR). The PCR can be the encoder clock count sent to synchronize the encoder clock, and can be used as the reference time when the video content is multiplexed in at least some embodiments. In at least some embodiments, the video content is buffered in the multiplexer, or mux, just prior to the interleave scheduler by the amount of the pull-up value. Such buffering can, however, result in a corresponding increase in latency of the encoded output through the pipeline.

Figure 3:
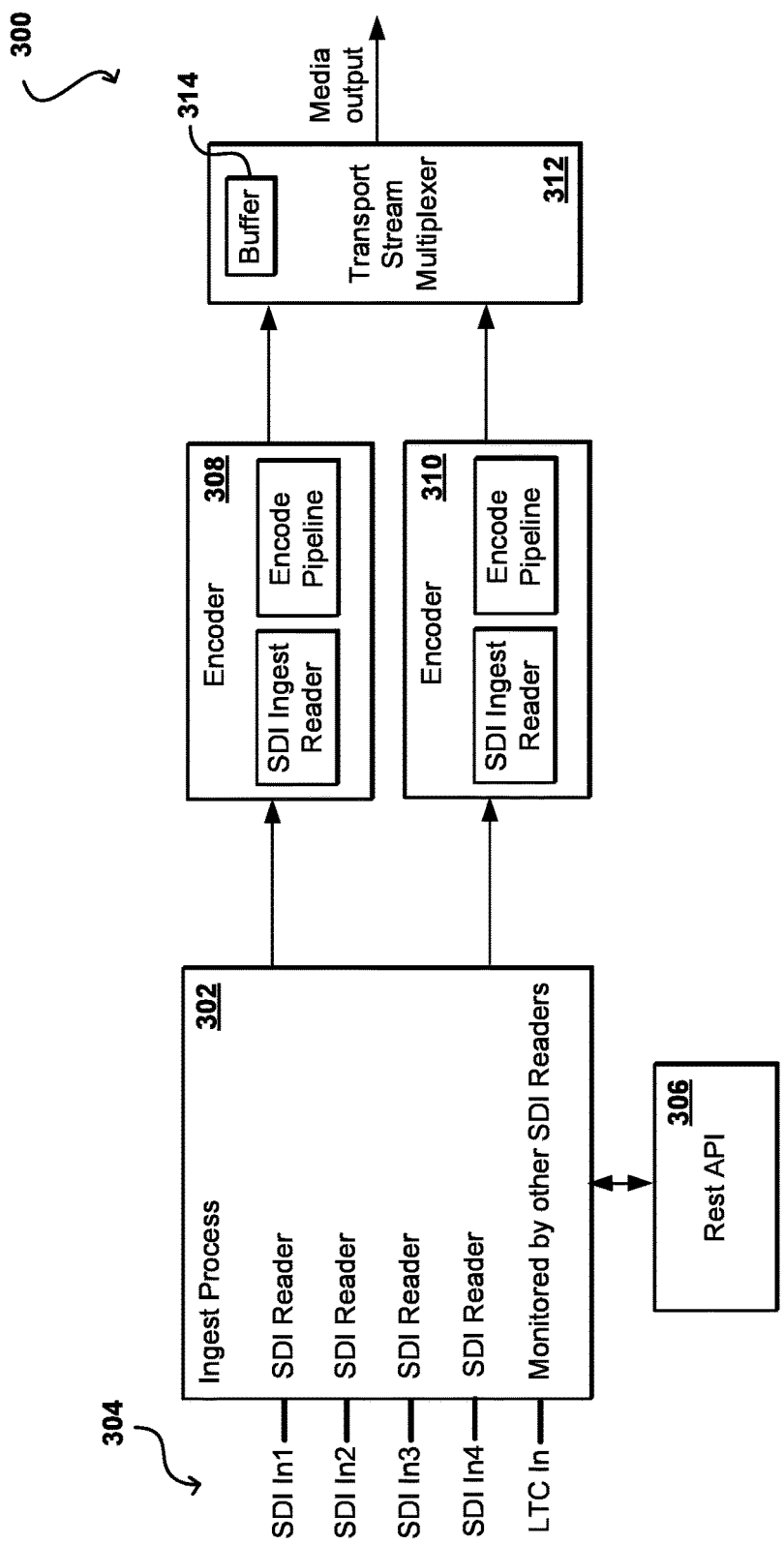
FIG. 3 illustrates an example encoding subsystem that can be utilized in accordance with various embodiments.

FIG. 3 illustrates an example system-level diagram 300 of components that can be used to provide such functionality in an environment such as those described with respect to FIGS. 1 and 2, such as may be provided by the encoder 222 component or system illustrated in FIG. 2. In this example diagram 300, an ingest process 302 is able to concurrently read from a set of SDI inputs, here SDI inputs In1, In2, In3, and In4. The ingest process is also able to read a linear (or longitudinal) timecode (LTC) input, which can be monitored by a set of SDI readers. Each SDI input can have its own SDI reader in the ingest process 302. The data read from an SDI input can be directed to a process such as a live encoding process 308, 310. If the SDI input included SCTE-104 messages, then in at least some embodiments the SCTE-104 messages can be converted to SCTE-35 messages during the ingest process, as part of the overall encoding process. An SDI ingest reader encoder can ingest the SDI input data as if reading the data from the corresponding SDI input, and can provide that data to the corresponding encoding pipeline which can then output the media content through the corresponding audio, video, or media output. As mentioned, the encoding pipeline in at least some embodiments can be responsible for converting the SCTE-104 messages to SCTE-35 messages to be passed as part of the transport stream. The encoding pipeline can also cause at least a portion of the media content to be processed using a video encoding engine, which in at least some embodiments can be shared amongst the various encoding processes. In some embodiments the encoding engine is offered as a service to which various processes can subscribe. As illustrated there can be multiple encoders 308, 310 working in parallel, which can process different data packets or primary and backup copies of the packets, among other such options. The encoded streams with the SCTE-35 messages can be received to a transport stream multiplexer 312, which can mux the streams into an appropriate media output that can be forwarded to the appropriate client device, or other destination, for display or other such action. In some embodiments the encoding can occur in the multiplexer 312 as well.

The multiplexer can include a dedicated buffer 314 in some embodiments that can enable the appropriate amount of media content to be held to allow for the SCTE-35 marker to be encoded at the appropriate location in the media stream. In one example, if content is arriving to the multiplexer at 30 frames per second and the pull-up on the SCTE-35 marker should be eight seconds, then the buffer 314 should be of sufficient size to hold two-hundred forty frames of content. As additional frames arrive the frames are pushed out of the buffer into an interleaver process (not shown) which will perform the multiplexing of the content. There can be at least three methods in the multiplexer, relating to video, audio, and data. The video frames can be stored into this "hold off" buffer, then when the data is received it can be determined that a SCTE-35 message is received and then the DTS assigned to that message can be determined. The appropriate millisecond pull-up value can then be selected from that DTS value and the SCTE-35 marker can then be pushed immediately into the multiplexer or interleaver in order to ensure the proper pre-roll time will be provided via the encoded transport stream. As mentioned, if there is a default pre-roll time for a SCTE-35 marker then the pull-up time can correspond to the difference in time between the default pre-roll time and the specified pre-roll time for the media content.

Approaches in accordance with various embodiments can also provide for input failover. Using an input failover approach, if a process detects that a particular input is no longer available, the process can attempt to ingest from a different input instead. The failover should occur quickly in many instances, such that adding a handshake to shut down a monitoring daemon might not be practical given the complexity involved. The monitoring information can be reported up to a Web layer, for example, where a Rest API 316 or other such interface can be exposed that can be queried by the customer. The Rest API response in some embodiments can list all the SDI inputs, along with audio/video format, loudness, input time code, and other such relevant information.

In conventional systems a pre-processor or other such component can take the SCTE-104 frame markers and move them forward in time so that any client device or other component ingesting the feed can detect the marker as it is received. Detection of the marker can indicate to the pre-processor that an action will take place on a frame that has not yet been received on the frame, so that the process has time to prepare to act for the specific frame once received. As mentioned, the time between when the SCTE-104 marker is received and the time when the corresponding action is to be taken is often referred to as the pre-roll time. The pre-roll time is typically on the order of seconds, although other lengths of time can be used as well. In various situations, however, a content provider might not want to invest in the pre-roll time.

Accordingly, approaches in accordance with the various embodiments can enable the markers to be inserted at the appropriate locations during the encoding process. A content provider, or other such entity, can utilize an API or other appropriate interface to specify a length of time, such as between 100 and 8,000 milliseconds, before the action frame at which to place the SCTE-35 marker. The SCTE-35 message can then be encoded into the stream at the appropriate location, which by the time codes will be placed the indicated amount of time before the inject point is located in the media stream. In the example of FIG. 3, the placing or pull-up of the SCTE-35 message can occur in the encode pipeline or in the transport stream multiplexer 312, among other such options. When the encoded stream is actually received by a downstream handler, for example, the hander can perform the content injection by recognizing the need for the injection, which can take a couple of seconds, preparing the content, which can take a few more seconds, then actually injecting the content. Accordingly, a pull-up time of five to ten seconds may be appropriate in some embodiments. Such an approach effectively encodes the pre-roll time into the output stream.

In the SDI input, the SCTE-104 marker will have a timestamp for the frame corresponding to the injection point. As mentioned in at least some embodiments the marker may correspond to a default pre-roll time. For customers or providers who do not want to utilize this pre-roll time, the default pre-roll value can be set to zero, or near zero, among similar such options. As mentioned, the translation from the SCTE-104 marker to the SCTE-35 marker can be performed at the point of ingest, which in FIG. 3 would correspond to the SDI ingest readers of the encoder processes. Conversion of a SCTE-104 message to a SCTE-35 message can occur according to the corresponding SCTE specification and, as such, will not be discussed herein in detail. As the frames progress through the system, the timestamps on the frames and the timestamps on the SCTE-35 message can remain synchronized. As the frames pass through the encode pipeline, the encoder in at least some embodiments can be notified that the frame specified by the SCTE-35 marker should become an IDR frame. The frames passing through the encoder then are passed to the transport stream multiplexer 312. The transport stream multiplexer will mux the frames, with each video frame in some embodiments having a presentation time stamp and a day decode time stamp associated therewith. The SCTE 35 message can also have an associated presentation time stamp (PTS). In some embodiments a transport stream multiplexer can have at least two parts. One part can perform the interleaving and can execute as quickly as possible until exhausting the elementary stream for one of the elements. There can be a video elementary stream and audio elementary stream, along with the SCTE-35 data. For the video and audio, if the frame comes through it will be muxed until there is not more video or audio, at which point the multiplexer will hold for the next piece of content to arrive.

Another part to the transport stream multiplexer is responsible for creating an additional video buffer that is sufficient to hold data for the specified pull-up time. The amount of memory needed can depend at least in part upon the video content, such as whether the content is compressed or in an uncompressed form. The buffer can be used to hold frames based on their time stamps until a given time stamp goes beyond the threshold for that pull-up. When a frame is received it will need to leave the buffer at a specific time, and the decode time stamp given to the video frame corresponds to the location where the fame will be placed in the overall muxing for that transport stream. By holding off for the determined length of time, the transport multiplexer can receive the SCTE-35 message, take that time stamp from that SCTE 35 message, subtract the length of time from where the marker should occur in the output stream, then let the frames pass through the multiplexer. The message can be pulled up in the overall stream, where the time stamp that is in the SCTE-35 message indicates the frame for which the injection should occur. The payload of that SCTE-35 message would not change, but the DTS tied to that message can denote where the marker needs to land in that transport stream output.

While examples presented herein discuss the specification of an amount of pre-roll time to be specified by a SCTE-35 marker, it should be understood that in some embodiments these approaches can be used to increase the amount of pre-roll time applied for a given injection point. In some embodiments the process might allow for four seconds of pre-roll time by default. A particular provider might want to increase the amount of pre-roll time to a specified pre-roll time, such as to add another four to eight seconds or pre-roll time. Here, the additional four to eight seconds would correspond to the pull-up time. This approach can enable that additional amount of time to be added during the encode process such that the correct amount of pre-roll time is provided. This can help to ensure that when the multiplexer is doing interleaving of the appropriate packets, that the correct amount of content is buffered and that the interleaver has not already passed the appropriate point for the SCTE-35 marker such that the marker might simply be dropped or left out of the encoded media stream. The approach would apply to any SCTE-35 markers in the stream, whether related to injection points or various other tasks. And in at least some embodiments a specific pre-roll time can be applied for each transport stream output, such that different encodings could have different pre-roll times.

Figure 4:
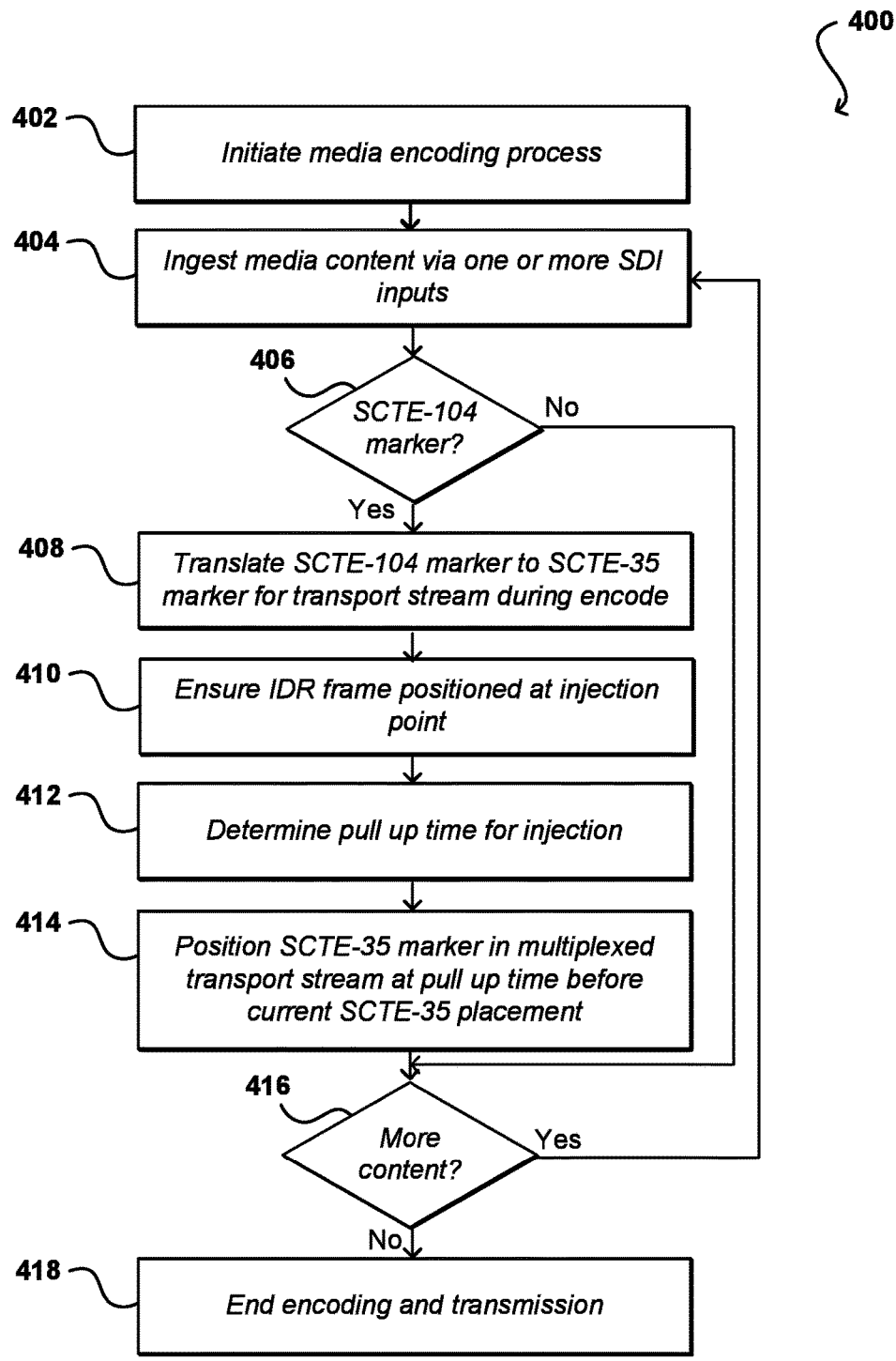
FIG. 4 illustrates an example process for encoding a pre-roll time marker into media content that can be utilized in accordance with various embodiments.

FIG. 4 illustrates an example process 400 for encoding the pre-roll time in an encoded data stream that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a media encoding process is initiated 402. This can involve one or more encoding, decoding, and/or transcoding jobs in at least some embodiments, where at least one encoding into a particular output format is to be provided. The input media content can be ingested 404 via one or more SDI inputs in this example, although other types of inputs can be utilized as well in accordance with various embodiments. If, during the ingesting and/or encoding, a SCTE-104 or other such marker is detected 406, then a process can be initiated to cause the corresponding pre-roll time to be encoded into the resulting transport stream. In this example, the SCTE-104 marker can be translated 408 to a SCTE-35 marker using conventional translation processes discussed elsewhere herein. It can also be ensured 410 that an IDR frame is positioned at the injection point corresponding to the SCTE-104 message. This can include, for example, verifying that an IDR frame is located at that point or causing an IDR frame to be injected at that point, among other such options. During the encoding process, the pull-up time for injection of the SCTE-35 message, relative to any default pre-roll time, can be determined 412. The SCTE-35 marker can then be positioned 414 in the multiplexed transport stream at the appropriate pull-up time location before the current or default SCTE-35 placement. The pull-up time will be used along with the default pre-roll time to obtain the desired overall pre-roll time for the injection of supplemental content. As mentioned, the video content can be buffered by an appropriate amount to ensure that the SCTE-35 marker can be encoded at the appropriate location in the transport stream once the SCTE-35 message is received. If it is determined 416 that there is more content to be encoded then the process can continue. Otherwise, the encoding and transmission of the content can end 418, at least for this specified output.

Figure 5:
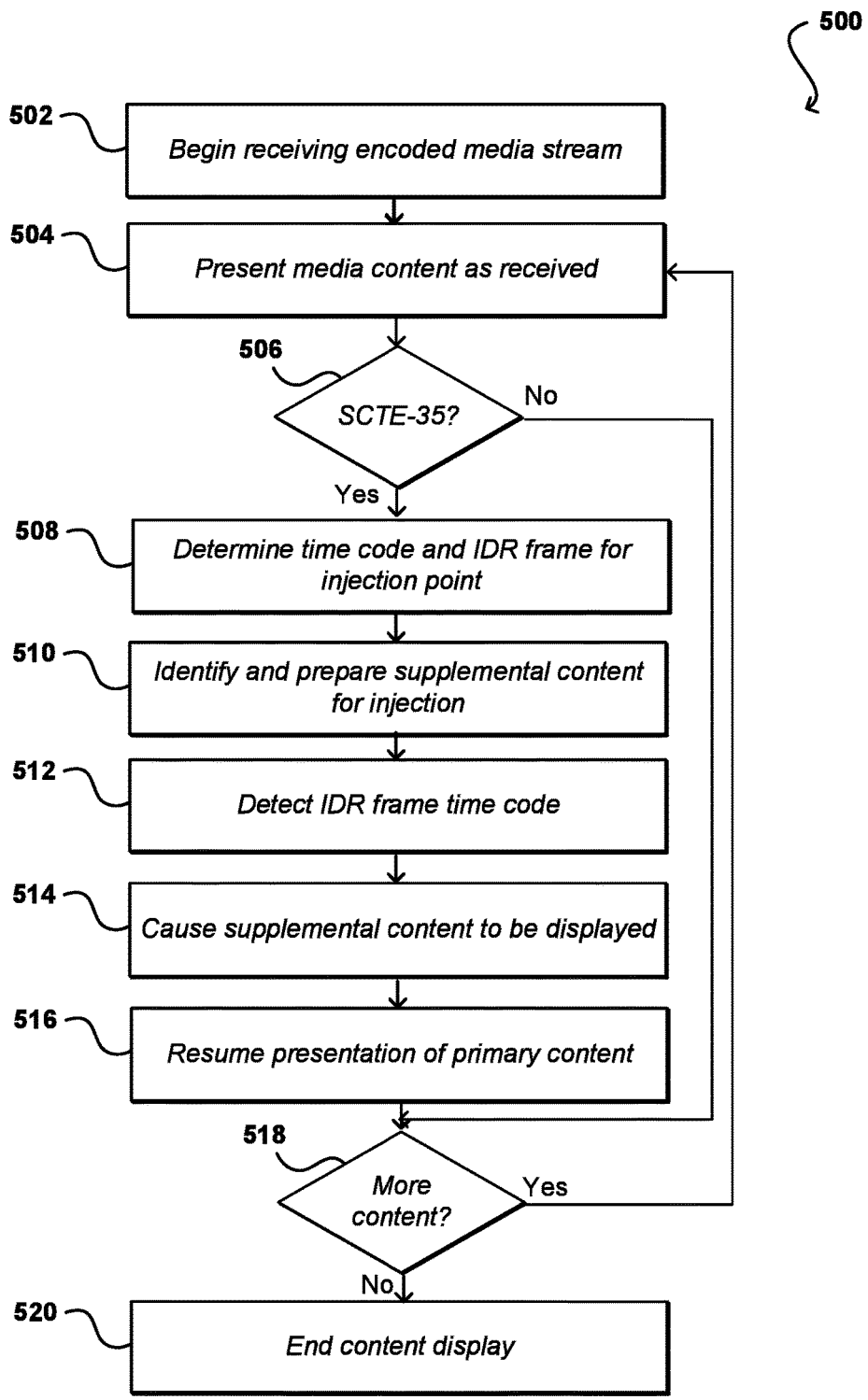
FIG. 5 illustrates an example process for displaying supplemental content according to a marker encoded into the media content that can be utilized in accordance with various embodiments.

FIG. 5 illustrates an example process 500 for displaying supplemental content according to an encoded pre-roll marker that can be utilized in accordance with various embodiments. In this example, an encoded media stream is received 502 to a particular electronic device, as may have requested to receive the stream for display on that device. The media content can then be presented 504 (i.e., displayed or otherwise provided for playback) via the device, such as may utilize one or more display elements, projectors, virtual reality displays, audio speakers, haptic elements, and the like. It should be understood that while the stream will be displayed in near real time, there will be some latency due to the process of receiving the content and preparing that content for presentation via the device. During the receiving and processing of the stream, a determination can be made 506 that a SCTE-35 marker is located in the stream. If so, the time code and/or IDR frame for the injection point associated with the SCTE-35 marker can be determined 508. The supplemental content to be displayed at the injection point can be identified 510 and prepared for injection or display at the appropriate time code. As mentioned, the supplemental content can be any appropriate content, such as may relate to promotional content, informational content, and the like. When the IDR time code and/or IDR frame is detected 512 or received in the media stream, the supplemental content can be caused 514 to be displayed, or otherwise presented, via the electronic device. The media content can then be buffered or packets held until appropriate to resume presentation of the media content upon completion of (or other action with respect to) the supplemental content. Upon such action, the presentation of the primary content for the media stream can resume 516. If it is determined 518 that there is more content being received on the stream then the process can continue. Otherwise, the presentation of the primary content on the device can be ended 520.

The encoding job in some embodiments can start a demuxer process, which can initiate a demux SDI to talk with the corresponding SDI reader ingest process. The demuxer process can demux the input into individual elementary streams, as may include separate streams for audio, video, and metadata, and direct the audio and video down respective transcoding pipelines. The transcoding process can thus send a command (i.e., start ingesting from SDI port 1 with these settings) which is picked up by the ingest process. The transcoding process can then copy those frames and pass them down the video/audio transcoding pipeline. After transcoding, a muxer component or process can combine the information into a single output of the desired format.

Figure 6:
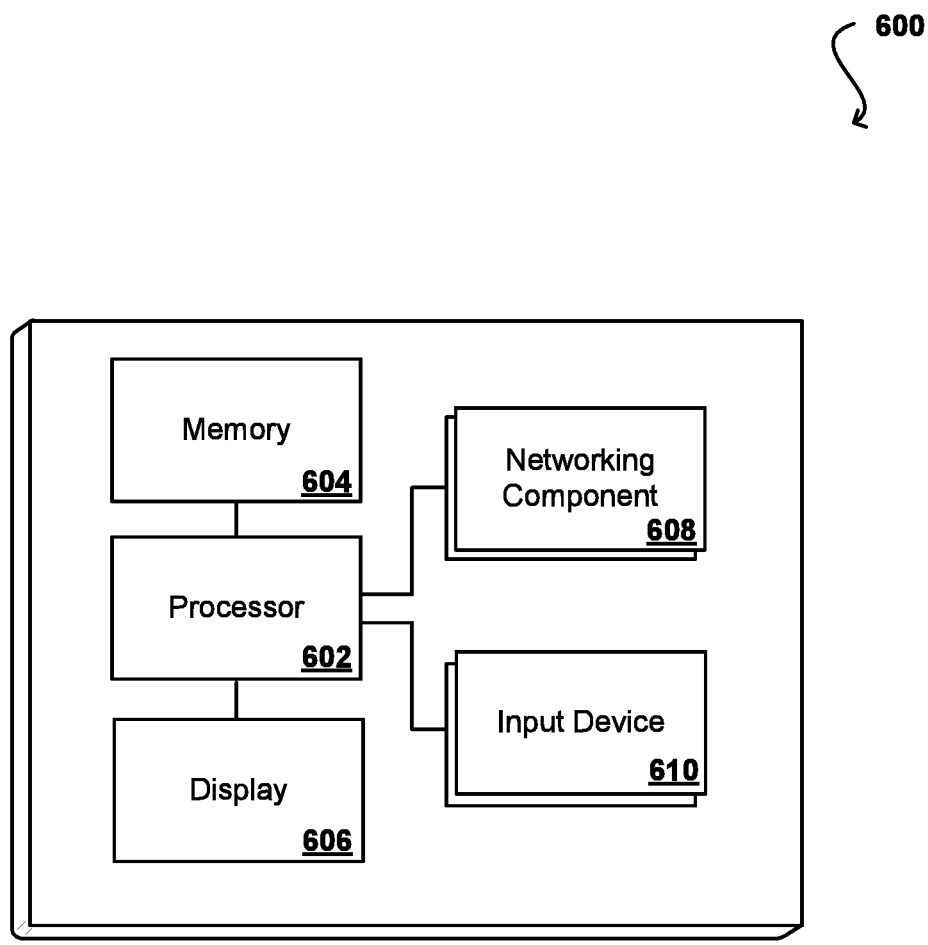
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving input content to an interface of an encoding system;
   detecting a SCTE-104 marker in the input content, the SCTE-104 marker indicating a time code in the input content corresponding to an injection point for supplemental content;
   translating the SCTE-104 marker to a SCTE-35 marker corresponding to the injection point, the SCTE-35 marker having a default pre-roll time;
   determining a pull-up time to be implemented for the SCTE-35 marker, the pull-up time corresponding to a difference between the default pre-roll time and a specified pre-roll time;
   buffering a video stream portion of the input content by an amount determined based at least in part upon a frame rate of the video stream portion and the pull-up time;
   receiving, at a multiplexer of the encoding system, the SCTE-35 marker;
   causing the SCTE-35 marker to be placed, in an output stream of encoded content, at a location corresponding to an amount of the pull-up time before a default location of the SCTE-35 marker determined based on the default pre-roll time; and
   transmitting the output stream to a client device, wherein the client device is enabled to detect the SCTE-35 marker during presentation of the encoded content and cause supplemental content to be presented.

2. The computer-implemented method of claim 1, further comprising:
   separating the input content into individual streams including at least the video stream portion and a data stream portion;
   receiving the SCTE-35 message over the data stream portion; and
   multiplexing at least the video stream portion and the data stream portion via the multiplexer to generate the output stream of encoded content, the encoded content corresponding to a format for presentation via the client device.

3. The computer-implemented method of claim 1, further comprising:
   ensuring that an instantaneous decoder refresh (IDR) frame is encoded into the output stream at the injection point such that any frames of video content located subsequent the IDR frame do not refer to video frames prior to the IDR frame in the output stream.

4. The computer-implemented method of claim 1, further comprising:
   receiving the input content to one of a serial digital interface (SDI) input, an asynchronous serial interface (ASI) input, an electronic data processing (EDP) input, a user datagram protocol (UDP) input, or a high-definition multimedia input (HDMI) of the encoding system.

5. A computer-implemented method, comprising:
   receiving media content to an interface of an encoding system;
   determining an action point of a video portion of the input media content;
   determining a specified pre-roll time to be implemented for the action point;
   encoding the media content to an output format for presentation via an electronic device;
   causing a pre-roll marker specified by SCTE-35 to be placed in the media content, during the encoding, at a determined location associated with an amount of pull-up time relative to a default pre-roll time specified by SCTE-35 for the action point, the pull-up time corresponding to a difference between the specified pre-roll time and the default pre-roll time; and
   providing, from the encoding system, the media content in the output format.

6. The computer-implemented method of claim 5, further comprising:
   buffering at least the video portion of the media content by at least an amount corresponding to the pull-up time, an amount of the buffering allowing the pre-roll marker to be placed in the media content at the determined location.

7. The computer-implemented method of claim 5, further comprising:
   multiplexing the video portion and at least an audio portion using a multiplexer of the encoding system, the video portion being buffered in a video buffer of the multiplexer.

8. The computer-implemented method of claim 5, further comprising:
   receiving the media content to one of a serial digital interface (SDI) input, an asynchronous serial interface (ASI) input, an electronic data processing (EDP) input, a user datagram protocol (UDP) input, or a high-definition multimedia input (HDMI) of the encoding system.

9. The computer-implemented method of claim 5, further comprising:
   detecting a SCTE-104 marker in the media content corresponding to the action point; and
   translating the SCTE-104 marker to the pre-roll marker.

10. The computer-implemented method of claim 9, wherein the pre-roll marker is received in the media content.

11. The computer-implemented method of claim 5, further comprising:
    ensuring that an instantaneous decoder refresh (IDR) frame is encoded into the media content at the action point such that any frames of video content located subsequent the IDR frame do not refer to video frames prior to the IDR frame in the media content, the action point being an injection point for displaying alternative content before resuming presentation of the media content.

12. The computer-implemented method of claim 5, further comprising:
    analyzing a program clock reference (PCR) to determine the location corresponding to the amount of the pre-roll time relative to the action point; and
    buffering at least the video portion of the media content in a video buffer of the encoding system, the video buffer positioned before an interleave scheduler of a multiplexer of the encoding system.

13. The computer-implemented method of claim 5, further comprising:
    separating the media content, received to the interface of the encoding system into individual streams including the video stream portion, an audio stream portion, and a data stream portion; and
    multiplexing the video stream portion, the audio stream portion, and the data stream portion to generate the media content in the output format.

14. The computer-implemented method of claim 5, further comprising:
    obtaining a value for the pre-roll time using an application programming interface (API) in communication with the encoding system.

15. A system, comprising:
    at least one processor; and
    memory including instructions that, when executed by the system, cause the system to:
        receive media content to an interface of an encoding system;
        determine an injection point of a video portion of the input media content;
        determine a specified pre-roll time to be implemented for the injection point;
        encode the media content to an output format for presentation via an electronic device;
        cause a pre-roll marker specified by SCTE-35 to be placed in the media content, during the encoding, at a determined location corresponding to an amount of pull-up time relative to a default pre-roll time specified by SCTE-35 for the action point, the pull-up time corresponding to a difference between the specified pre-roll time and the default pre-roll time; and
        provide, from the encoding system, the media content in the output format.

16. The system of claim 15, wherein the instructions when executed further cause the system to:
    buffer at least the video portion of the media content until the pre-roll marker is received indicating the injection point, an amount of the buffering sufficient to enable the pre-roll marker to be placed in the media content at the location corresponding to the amount of the pre-roll time relative to the injection point.

17. The system of claim 15, wherein the instructions when executed further cause the system to:
    detect a SCTE-104 marker in the media content corresponding to the injection point; and
    translate the SCTE-104 marker to the pre-roll marker.

18. The system of claim 15, wherein the instructions when executed further cause the system to:
    ensure that an instantaneous decoder refresh (IDR) frame is encoded into the media content at the injection point such that any frames of video content located subsequent the IDR frame do not refer to video frames prior to the IDR frame in the media content.

19. The system of claim 15, wherein the instructions when executed further cause the system to
    analyze a program clock reference (PCR) to determine the location corresponding to the amount of the pre-roll time relative to the injection point; and
    buffer at least the video portion of the media content in a video buffer of the encoding system, the video buffer positioned before an interleave scheduler of a multiplexer of the encoding system.

20. The system of claim 15, wherein the instructions when executed further cause the system to:
    separate the media content, received to the interface of the encoding system into individual streams including the video stream portion, an audio stream portion, and a data stream portion; and
    multiplex the video stream portion, the audio stream portion, and the data stream portion to generate the media content in the output format.

* * * * *